Sept. 10, 1968     D. KOSACHEFF     3,400,888
FLUID DISTRIBUTING AND FLOW VOLUME CONTROL
Filed June 17, 1966
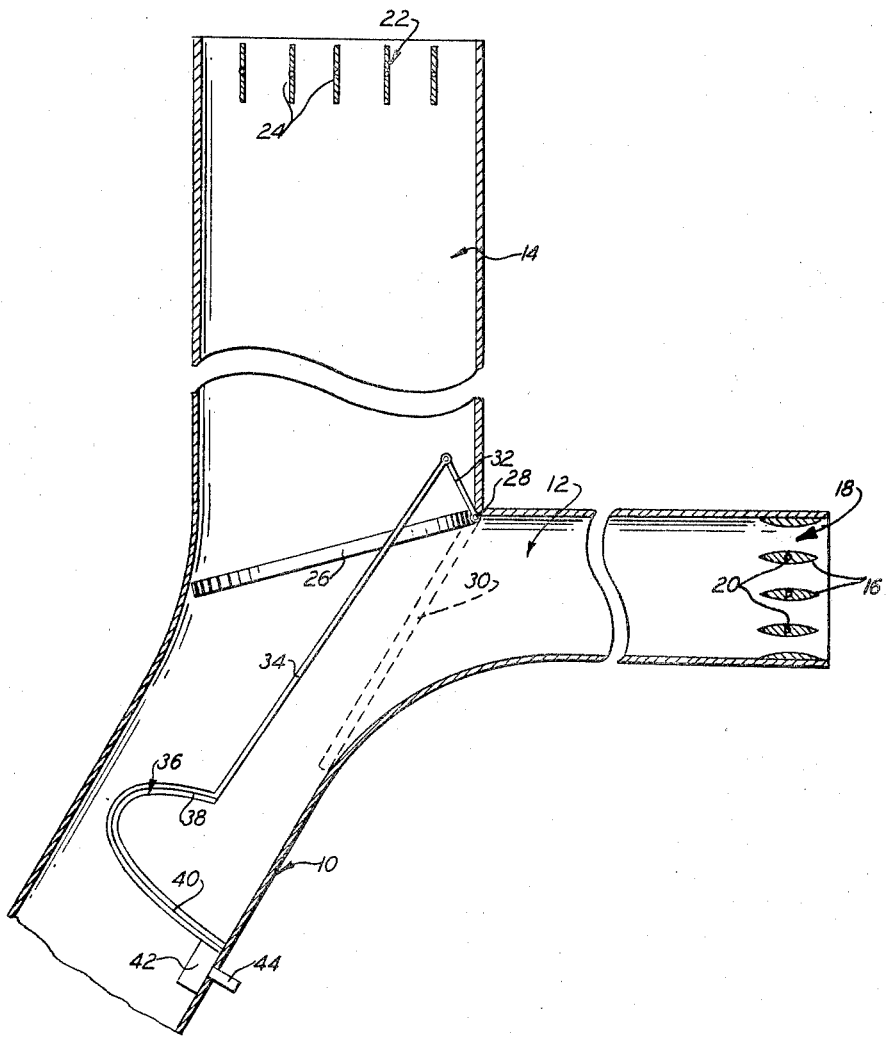
DIMITRI KOSACHEFF
INVENTOR
BY John R. Faulkner
Robert E. McCallum
ATTORNEYS United States Patent Office
3,400,888
Patented Sept. 10, 1968

3,400,888
FLUID DISTRIBUTING AND FLOW VOLUME CONTROL
Dimitri Kosacheff, New Boston, Mich., assignor to Ford Motor Company, Dearborn, Mich., a corporation of Delaware
Filed June 17, 1966, Ser. No. 558,351
2 Claims. (Cl. 236—93)

ABSTRACT OF THE DISCLOSURE

An air flow manifolding for controlling flow volume, velocity and direction of flow; a movable shuttle gate initially provides flow through a low volume branch outlet having an orifice in the discharge to increase flow velocity, a decrease in temperature moving the gate to provide flow through an unrestricted outlet branch having an area comparable to that of the main duct.

---

This invention, in general, relates to a fluid flow distributor. More particularly, it relates to a fluid flow control preferably for use as a part of a motor vehicle air conditioning system, although it has use in many other installations as well.

Most commercial motor vehicle type air conditioning systems provide no means for proportioning automatically the flow volume or direction of air discharged through the various air outlets into the vehicle passenger compartment. As a result, during initial and later phases of operation of the system, the passenger often is subject to the flow of a large volume of cold air directly at him while the remaining portions of the compartment is being cooled.

The invention is directed to a fluid distributing system consisting of a plurality of outlets for the cooling air and an automatic control to control the flow volume and direction by switching the flow of air from one of the outlets to the remaining in response to a change in the temperature of the air.

The invention includes a main air conduit leading from an air conditioning evaporator member, and having a plurality of branch conduits, one of which is of smaller cross-sectional area than the other and contains flow restricting means to reduce the discharge flow volume. A gate is pivotally mounted to swing alternately across one or the other of the passages so as to provide air flow through only one passage at a time. The gate is moved in response to movement of a temperature sensitive element located in the main air stream. The small branch passage is aimed so as to directly cool a passenger by a small flow volume of air. When the air temperature lowers to a level that might be uncomfortable to the passenger by the direct air stream, the flow is switched to a larger outlet directed away from the passenger, and the flow volume increases. The initial small volume of air flow through the restricted smaller branch discharge permits a rapid cooling of this air by the air conidtioning evaporator member.

Therefore, it is one of the objects of the invention to provide a fluid flow distributing system that initially provides a small flow volume of fluid in one direction and subsequently automatically provides an increase in the flow volume and a change in the direction of discharge.

It is another object of the invention to provide an air distributing means consisting of a main air conduit containing a fluid progressively lowering in temperature, and having a plurality of branch discharge passages, one of which is of smaller cross-sectional area than the other and contains flow restriction means; flow through the two branch passages being controlled by a movable flow blocking gate means that moves automatically in response to changes in the temperature of the fluid from a position blocking flow through one discharge to a position blocking the other discharge while opening the first.

It is a still further object of the invention to provide an air distributor means consisting of a main air flow conduit having two alternately openable angled discharge passages of different flow capacities controlled by a gate automatically actuated by a bimetallic temperature sensitive element located in the main conduit and connected to the gate and movable in accordance with the changes in temperature of the air in the main conduit.

Other objects, features and advantages of the invention will become apparent upon reference to the succeeding, detailed description thereof, and to the drawing showing a cross-sectional view of a preferred embodiment of the invention.

The figure shows the outlet portion of an air conditioning unit that preferably is for use in cooling the passengers and interior of a motor vehicle. It includes a main outlet fluid conduit 10 that would be connected at its lower end to the evaporator (not shown) of a known type of air conditioning unit suitable for installation in motor vehicles.

When the above type of unit is in operation, at the instant of initial operation, the air contained in the ducts is relatively warm (assuming a warm ambient temperature), and progressively lowers in temperature as the evaporator removes the heat from the incoming air, in a known manner. The upper end of main conduit 10 has two joined, angled branch discharge passages 12 and 14. Conduit 12 is smaller in cross-sectional area than conduit 14, and contains a plurality of circumferentially spaced orifice-like baffles 16. The baffles restrict the flow volume of air therethrough, as well as increase the flow velocity. The orifice-like members 16 together constitute a directing grill 18 for guiding the air. Preferably, they are mounted on pivot pins 18 and interconnected to a lever (not shown) that can be operated manually by an occupant of the vehicle to deflect the discharging air in the desired direction.

Conduit 14, on the other hand, is of a relatively large cross-sectional area so as to provide essentially no restriction to flow of fluid therethrough from conduit 10. Conduit 14 also contains an air-flow directing grill 22 consisting of very thin pivotally mounted baffles 24 that are widely circumferentiallly spaced so as to not interfere with the discharge flow. Like grill 18, baffles 24 would be connected by a common lever, not shown, to a manual control, also not shown.

Flow from main conduit 10 into either of conduits 12 or 14 is controlled by an arcuately swingable gate 26. The gate is fixed to a pin 28 pivotally mounted at the juncture of the branch conduits. The gate is swingable from the full line position shown to the dotted line position 30 to open conduit 14 and block conduit 12, or vice versa. Also fixed to pivot pin 28 is a short lever 32 that is pivotally connected at its opposite end to a push-pull rod 34. Rod 34 in turn is pivotally connected to one end of a bimetallic temperature sensitive member 36.

Member 32 may be of a known construction consisting of a lamination of two metals having different coefficients of expansion. It is suitably curved so that changes in temperature will cause one of the metals to expand or contract in length faster than the other and thereby cause a swinging movement of the end 38 towards or away from the main portion 40, as the case may be, in a known manner.

The normally stationary end 40 of member 36 is fixed to a linearly adjustable member 42 that is slidably mounted on the wall of conduit 10. A handle 44, graspible by the vehicle occupant, permits applying a preload on the bimetallic element portion 40 relative to the gate 26, and, therefore, can vary the temperature at which the bimetallic element will switch the gate or vane 20 from one position to the other. Also, it permits switching the gate manually, or setting the gate to an intermediate position, if desired.

In operation, and assuming warm ambient temperature conditions, gate 26 would be positioned as shown blocking conduit 14 in response to the differential expansion of the bimetallic elements of unit 36 at this temperature. Initial operation of the air conditioning unit, therefore, first provides a flow of relatively warm air through conduit 10 towards the branch conduit 12. Because of the smaller cross-sectional area of conduit 12, and because of the flow restriction orifice type baffles 16, the volume of flow through conduit 12 will be small. This, of course, results in a rapid cooling of the air since it passes slowly through the evaporator. The vehicle operator, therefore, would pivotally move grill 18 to direct the air flow directly at the passengers, at an increased velocity. The air would have a cooling effect on the passenger, and yet would not subject the passenger to a chilling blast of cold air.

When the temperature of the air in conduit 10 from the evaporator reaches a predetermined lower value, the bimetallic element of member 36 having the greater coefficient of contraction will start pulling rod 34 downwardly and thereby progressively pivot gate or vane 26 towards its dotted line position 30 until conduit 12 becomes entirely closed. During this time, the air will progressively change in direction and the flow volume will increase until all of the air flows out through the larger cross-sectional area discharge conduit 14 in a relatively unrestricted manner. Grill 22 directs this air flow away from the passenger into the overall volume of the vehicle passenger compartment, thus avoiding unpleasant blasts of cold air directly at the passenger through outlet 12.

While the switching mechanism has been illustrated and described as a bimetallic temperature sensitive element, it will be clear that other suitable switching mechanisms responsive to temperature changes, with or without built-in hysteresis effect, could be used without departing from the scope of the invention. Also, it will be clear that while the gate 26 is shown as having a progressive movement from one position to the other, a snap action could be provided, if desired, to quickly move the gate from one position to the other.

From the above, therefore, it will be seen that the invention provides and automatic control for changing both the direction of flow and the flow volume of a fluid in accordance with temperature changes of the fluid to provide a more satisfactory method of operation of an air conditioning system for use to cool the passenger compartment of a motor vehicle.

While the invention has been illustrated in the figure in its preferred embodiment, it will be clear to those skilled in the art to which the invention pertains that many changes and modifications may be made thereto without departing from the scope of the invention.

I claim:

1. A fluid distributor comprising, in combination, a main longitudinally extending fluid conduit containing a source of fluid under pressure progressively varying in temperature, a pair of branch fluid discharge passages joined to each other and to said main conduit at one end thereof, one of said branch passages having a smaller cross-sectional flow area than the other, orifice means in the discharge portion of said one branch passage further reducing the volume of fluid flow therethrough and increasing the discharge velocity thereof, said other branch passage having a cross-sectional area comparable to that of said main conduit and a relatively unrestricted discharge outlet to provide for the free flow of air therebetween essentially without a reduction in flow, fluid flow blocking gate means pivotally secured to the juncture of said conduit and passages and movable alternately from one position across one passage blocking flow through said one passage while permitting flow through the other passage to an alternate position blocking said other passage and unblocking said one passage, and temperature sensitive means in the path of fluid flow connected to said gate and progressively movable in response to the progressive attainment of a predetermined temperature level of the fluid for progressively moving said gate from one position to the other.

2. A fluid distributor as in claim 1, including manually operable override means operably secured to said temperature sensitive means and said gate for manually moving said gate at will between said positions.

References Cited

UNITED STATES PATENTS

| | | | |
|---|---|---|---|
| 2,011,546 | 8/1935 | Waltenberg | 236—93 |
| 2,054,997 | 9/1936 | Vang | 123—122 |
| 2,380,839 | 7/1945 | Hand | 165—34 X |
| 2,611,543 | 9/1952 | Sticht | 236—93 |
| 3,129,886 | 4/1964 | Liebermann | 236—49 |

ROBERT A. O'LEARY, *Primary Examiner.*

W. E. WAYNER, *Assistant Examiner.*